United States Patent
Hofman et al.

(10) Patent No.: US 10,809,142 B2
(45) Date of Patent: Oct. 20, 2020

(54) STEAM PHYSICAL PROPERTY MEASUREMENT USING GUIDED WAVE RADAR

(71) Applicant: HONEYWELL INTERNATIONAL INC., Morris Plains, NJ (US)

(72) Inventors: Gertjan Hofman, Vancouver (CA); Michael Kon Yew Hughes, Vancouver (CA)

(73) Assignee: Honeywell International Inc., Morris Plains, NJ (US)

( * ) Notice: Subject to any disclaimer, the term of this patent is extended or adjusted under 35 U.S.C. 154(b) by 310 days.

(21) Appl. No.: 15/935,283

(22) Filed: Mar. 26, 2018

(65) Prior Publication Data
US 2019/0293510 A1   Sep. 26, 2019

(51) Int. Cl.
*G01L 11/00*   (2006.01)
*G01K 11/00*   (2006.01)
*G01F 23/284*  (2006.01)

(52) U.S. Cl.
CPC ............ *G01L 11/00* (2013.01); *G01F 23/284* (2013.01); *G01K 11/006* (2013.01)

(58) Field of Classification Search
CPC ..... G01F 23/284; G01K 11/006; G01L 11/00; G01S 13/04; G01S 13/10; G01S 13/88; G01S 7/41
See application file for complete search history.

(56) References Cited

U.S. PATENT DOCUMENTS

| | | | |
|---|---|---|---|
| 6,295,018 B1 * | 9/2001 | Diede | G01F 23/284 342/124 |
| 7,345,623 B2 | 3/2008 | McEwan | |
| 7,525,476 B1 * | 4/2009 | Delin | G01F 23/284 324/600 |
| 2003/0010116 A1 * | 1/2003 | Cavazzin | G01F 23/284 73/290 V |
| 2006/0170543 A1 * | 8/2006 | Schaffer | G01F 23/284 340/521 |
| 2012/0056774 A1 * | 3/2012 | Wennerberg | G01F 23/284 342/124 |
| 2014/0084945 A1 * | 3/2014 | Edvardsson | G01F 23/284 324/644 |

(Continued)

FOREIGN PATENT DOCUMENTS

WO   2013175664 A1   7/2012

*Primary Examiner* — Timothy X Pham

(57) ABSTRACT

A guided wave radar (GWR)-based method of measuring steam pressure includes transmitting at least a first microwave pulse signal from a GWR sensor system having a pulsed radar gauge (PRG) implementing a steam measurement algorithm coupled to a transceiver that is coupled to a GWR probe in a steam boiler tank having a reference reflector (RR) providing an impedance discontinuity. The transmitting the first microwave pulse signal is with water and steam in the steam boiler tank. An echo emanating from the RR is received responsive to the first microwave pulse signal generates that respective time of flight (TOF) measurement data. A refractive index value for the steam is determined from the TOF measurement data and a reference TOF value representing a TOF measurement without the steam in the steam boiler tank. A physical property of the steam is determined from the refractive index value, such as the pressure.

19 Claims, 2 Drawing Sheets

(56) References Cited

U.S. PATENT DOCUMENTS

2018/0088054 A1\* 3/2018 Stockwell ................. G01F 1/74
2018/0306631 A1\* 10/2018 Janitch .................. G01F 23/284
2019/0063982 A1\* 2/2019 Kesba ................... G01F 23/284

\* cited by examiner

100

```
┌─────────────────────────────────────────────────────────────┐
│ TRANSMITTING AT LEAST A FIRST MICROWAVE SIGNAL FROM A GUIDED│
│ WAVE RADAR (GWR) SENSOR SYSTEM COMPRISING A PULSED RADAR    │
│ GAUGE (PRG) INCLUDING A PROCESSOR IMPLEMENTING A STEAM      │──101
│ MEASUREMENT ALGORITHM COUPLED TO A TRANSCEIVER THAT IS      │
│ COUPLED TO A GWR PROBE HAVING A REFERENCE REFLECTOR (RR)    │
│ ALONG ITS LENGTH PROVIDING AN IMPEDANCE DISCONTINUITY INTO  │
│ A STEAM BOILER TANK. THE TRANSMITTING OF THE FIRST MICROWAVE│
│ SIGNAL IS WITH WATER AND STEAM IN THE STEAM BOILER TANK.    │
└─────────────────────────────────────────────────────────────┘
                            │
                            ▼
┌─────────────────────────────────────────────────────────────┐
│ RECEIVING AN ECHO EMANATING FROM THE REFERENCE RR RESPONSIVE│──102
│ TO THE FIRST MICROWAVE SIGNAL TO GENERATE TIME OF FLIGHT    │
│ (TOF) MEASUREMENT DATA.                                     │
└─────────────────────────────────────────────────────────────┘
                            │
                            ▼
┌─────────────────────────────────────────────────────────────┐
│ DETERMINING REFRACTING INDEX VALUE OF THE STEAM FROM THE TOF│──103
│ MEASUREMENT DATA TOGETHER WITH A TOF REFERENCE VALUE        │
│ REPRESENTING A TOF MEASUREMENT WITHOUT STEAM IN THE STEAM   │
│ BOILER TANK.                                                │
└─────────────────────────────────────────────────────────────┘
                            │
                            ▼
┌─────────────────────────────────────────────────────────────┐
│ DETERMINING AT LEAST ONE PHYSICAL PROPERTY OF THE STEAM     │──104
│ FROM THE REFRACTIVE INDEX VALUE.                            │
└─────────────────────────────────────────────────────────────┘
```

FIG. 1

STEAM PHYSICAL PROPERTY MEASUREMENT USING GUIDED WAVE RADAR

FIELD

Disclosed embodiments relate to steam physical property measurements, such as a pressure or temperature measurement.

BACKGROUND

Steam boilers generate significant pressure levels due to the formation of steam from water. To implement pressure control for boilers for safety reasons, the steam pressure is measured, and a corrective action taken in the event of an over pressure event, such as shutting down the boiler or the opening of a pressure relief valve. Conventionally, pressure gauges are used to measure the pressure in steam boilers. Another important measurement for steam boilers is the water level in the steam boiler tank. Pressure gauges are typically used to infer the water level in the tank. However, this is an indirect level sensing method.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize conventional pressure gauge water level sensing for steam boilers can be unreliable and inaccurate. Sources of error for known pressure-based level measurements include a primary error source being that pressure transmitters generally will assume a constant density for liquid water, although the water density can vary significantly with temperature. Moreover, the temperature may not be known because the pressure transmitter tubing is not at the same temperature as the steam boiler is in while in a start-up condition. The steam pressure can become inaccurate also because the small-gauge tubing suppling steam sampling steam to the pressure transmitters can become clogged up. It is also recognized that a steam temperature measurement can be as important as a steam pressure measurement.

However, the steam temperature is not necessarily known due to heat loss in the measurement system. Temperature transmitters can be inaccurate because the temperature sensors (such as thermistors, for example) are placed in the wall of the boiler tank which may be a bit colder than the actual steam/water temperature inside the boiler tank. Knowing the steam pressure and temperature parameters enables process efficiency and safety, as the generally steel boiler tank will weaken considerably at high temperature, therefore it is important to keep the temperature within the safety limits.

Moreover, it is recognized that steam boiler installations may already have a guided wave radar (GWR) level gauge having a probe with a reference reflector (RR) along its length for direct level measurement of the water level in the steam boiler tank. A secondary measurement of a steam physical property such as pressure and/or temperature in a steam boiler using a GWR sensor (or gauge) is therefore recognized to be available using some parameter linking equations available without increasing cost to the customer. The steam physical property measurement can be obtained from the same microwave pulses used for the sensing the water level. In summary, in disclosed methods, the GWR probe RR reflection-based TOF measurement data in GWR steam applications is used to calculate at least one steam physical parameter, such as pressure and temperature. One method measures a refractive index value for the steam from the TOF measurement data, where the refractive index value of the steam can then be related via published tables to a steam physical property, such as to pressure and temperature.

One disclosed aspect comprises a GWR-based method of measuring at least one steam physical parameter comprising transmitting at least a first microwave pulse signal from a GWR sensor system into a steam boiler tank. The GWR sensor system comprises a pulsed radar gauge (PRG) including a processor that implements a steam measurement algorithm coupled to a transceiver that is coupled to a GWR probe having a RR along its length providing an impedance discontinuity. The transmitting the first microwave signal is with water and steam in the steam boiler tank. An echo emanating from the RR that is responsive to the first microwave pulse signal is received, and a reference TOF value is provided representing a TOF measurement without steam in the steam boiler that are together used to determine at least one physical property of the steam, the physical property generally being pressure and/or temperature.

BRIEF DESCRIPTION OF THE DRAWINGS

FIG. 1 is a flow chart that shows steps in an example method of steam physical property measurement using a GWR system, according to an example aspect.

DETAILED DESCRIPTION

Figure 2:
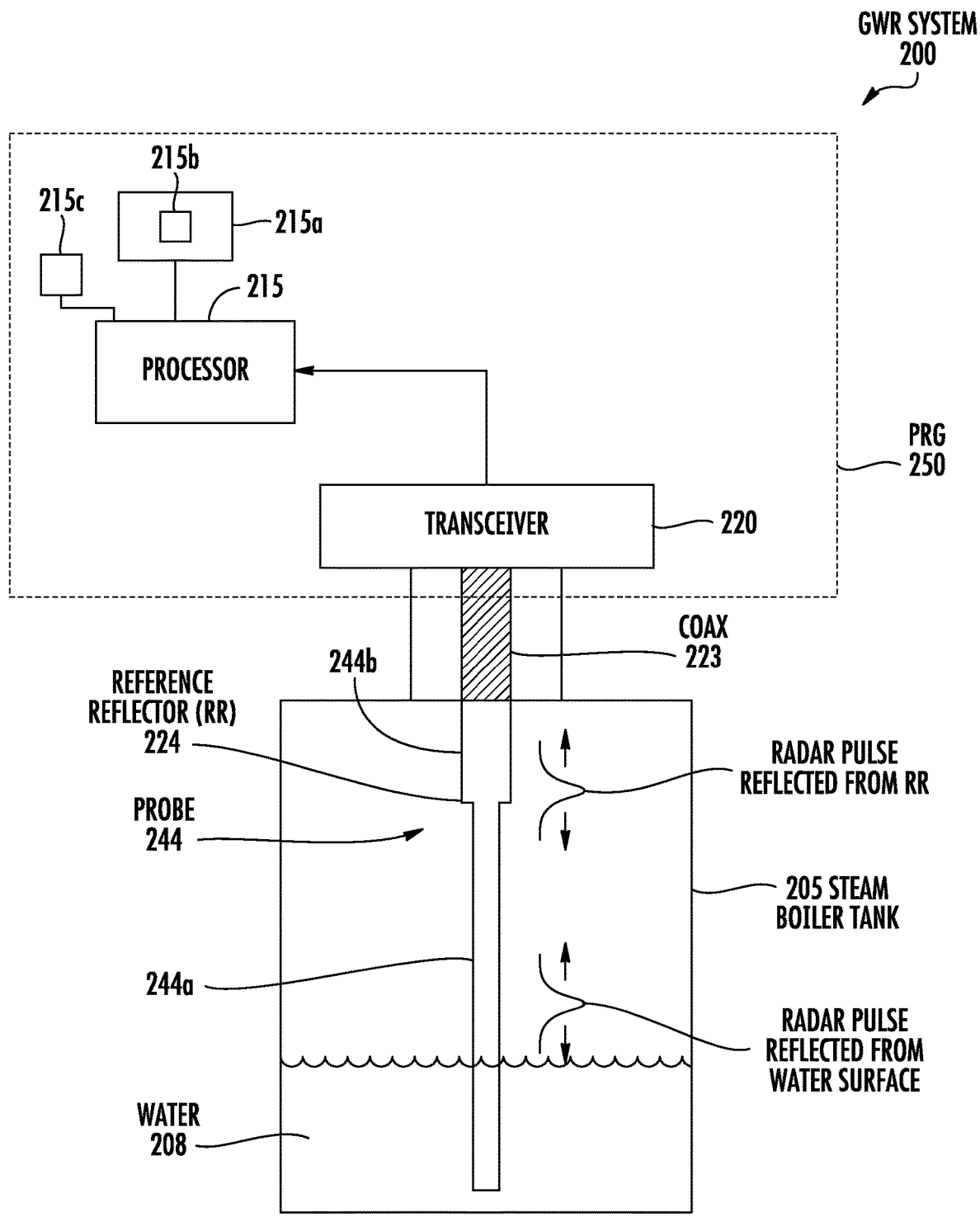
FIG. 2 depicts an example GWR system for providing a method of steam physical property measurement, according to an example aspect.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

The Disclosure recognizes microwaves, such as from GWR sensors or gauges, are in principle not affected by the temperature or pressure of the media they pass through on their way to a surface or an interface in a tank that will reflect the microwaves. This temperature and pressure invariance makes the application of GWR for level sensing generally robust. GWR is known to be a contact radar device based on pulsed microwave technology, and generally use pulses of electromagnetic waves with frequencies from 1.5 GHz to 2 GHz, known as microwaves. Unlike competing level measurement technology such as ultrasound, microwaves are typically not affected by pressure or temperature of the media. When the microwave pulses hit the media (e.g., an interface), a significant proportion of the pulse energy is reflected back up the probe back to the GWR device. The distance to the material is directly proportional to half the propagation time. This is the basic principle of time-domain reflectometry and thus of GWR sensing.

However, GWR-based level sensing for steam is recognized to be a significant exception to temperature and pressure invariance because water has unique molecular properties, such as strong hydrogen bonding. When the steam's temperature and/or pressure changes, the microwave propagation speed slows significantly, which can adversely affect the TOF measurement used for the GWR-based level measurement. To address this effect, one can measure the TOF to a RR which provides a sharp impedance discontinuity that is provided along the probe length, thus located a known distance away. (see the RR 224 of the probe 244 in FIG. 2 described below). This impedance discontinuity introduces a large percent reflection at the RR interface. The RR is generally in practice simply a diameter change (a diameter decrease, to provide a lower impedance, such as shown in FIG. 2) in the probe.

Applicants have unexpectedly determined how to utilize the basis of the temperature and pressure variance problem for GWR-based water level measurement to use GWR to determine at least one steam one physical property in the steam boiler tank. The apparent change of the distance to the RR from a top reference level being an impedance change inside a process connector (such as coax 225 in FIG. 2) from a TOF measurement is determined with liquid and steam in the steam boiler tank, and optionally without the water and steam in the steam boiler tank to generate a TOF reference value. In general the GWR transmitter is mounted on a valve-separated bypass arrangement such that during GWR commissioning, and the bypass alone can be emptied to provide the reference TOF measurements.

The TOF measurement (with steam in the boiler tank) and a TOF reference value (with no steam in the boiler tank) provides a measured value for the refractive index (n) of the steam, where:

$n$=(distance observed with steam present in the boiler tank)/(distance observed with no steam present in the boiler tank).

n can then be used to correct the observed distance (DISTobs) to the true level of the liquid water in the boiler tank (DISTtrue), where:

DISTtrue=DISTobs/$n$

There exists both empirical data as well as physical models relating n to the temperature of the steam. One source for this information is provided in a paper by M. Uematsu and E. U. Franck, Static Dielectric Constant of Water and Steam, J. Phys. Chem. Ref. Data, Vol 9, No 4. (1980), incorporated by reference herein. The temperature of saturated steam, meaning that there can be essentially no air or other gas(es) in the steam, can then be related to the steam pressure using commonly available lookup charts (or tables). It is noted that the ideal gas equation is generally not sufficiently accurate to use for this purpose, although there are more complicated equations which are likely sufficiently accurate enough for this calculation.

FIG. 1 is a flow chart that shows steps in an example method 100 of steam pressure measurement using a GWR system including a GWR probe having a RR, according to an example aspect. Step 101 comprises transmitting at least a first microwave pulse signal from a GWR sensor system comprising a PRG including a processor implementing a steam measurement algorithm coupled to a transceiver that is coupled to a GWR probe having a RR along its length providing an impedance discontinuity into a steam boiler tank. The transmitting of the first microwave pulse signal is with water and steam in the steam boiler tank. In practice the microwave pulse signal used is thousands of pulses, and one constructs a pulse 'signal' from all these individual pulses using equivalent time sampling.

Step 102 comprises receiving an echo emanating from the RR responsive to the first microwave signal to generate respective TOF measurement data. Step 103 comprises determining at least one physical property of the steam, such as pressure and/or temperature, from the TOF measurement data together with reference a TOF value representing a TOF measurement without steam in the steam boiler tank. In one embodiment a look-up table can be generated that relates the apparent length of the RR to the temperature or pressure, so there is no need for first calculating the index of refraction. However, the method can instead comprise comprises determining a refractive index value of the steam, and then calculating the physical property of the steam from the refractive index value.

The same microwave signal can also is also used for determining a level of the water in the steam boiler tank. The method can further comprise comparing the physical property comprising at least one of pressure and temperature of the steam to a predetermined level, and automatically initiating at least one corrective action in an event of an over pressure or over temperature condition. The corrective action can comprise automatically issuing an alarm, an opening of a pressure relief valve, or turning off a heater associated with the steam boiler.

The GWR sensor system may not be used as the only pressure/temperature indicator for a steam boiler system. For example, one use for disclosed GWR-derived steam pressure and/or temperature data is to compare against existing pressure/temperature transmitters already installed on the steam boiler tank.

The method can further comprise comparing the physical property comprising at least one of pressure and temperature of the steam to a predetermined level, and automatically initiating at least one corrective action in an event of an over pressure or over temperature condition, or for control using a set point and adjusting at least one of heating and flow rates to keep at least one of temperature and pressure at the set point. The corrective action can comprise actions including issuing an alarm, opening of a pressure relief valve, reducing a fuel flow rate, or adding cooling water.

As known in the art, the calculations used for disclosed steam physical property measurement using GWR signals may be implemented by hardware or be implemented by software. Regarding hardware-based implementations, algorithm equations can be converted to a logic gate pattern, such as using VHDL (a Hardware Description Language) that can then be realized using a programmable device such as a field-programmable gate array (FPGA) or a dedicated application-specific integrated circuit (ASIC) to implement the logic gate pattern. Regarding software-based implementations, code for such functions stored in a memory can be implemented by a processor. The processor can comprise a digital signal processor (DSP), a microcontroller, an application specific integrated circuit (ASIC), a general processor, or any other combination of one or more integrated processing devices.

FIG. 2 depicts an example GWR system 200 installed at the top of a steam boiler tank 205 that includes a PRG 250 and a processor 215. As known in the art, the GWR system 200 can also be indirectly connected to the steam boiler tank 205. For example, the GWR system can be chamber connected to the steam boiler tank 205 in a 'bypass' configuration typically with a small diameter pipe with connections to both the bottom and the top of the steam boiler tank 205 such that the level in the chamber is essentially the same as the level in the tank. The processor 215 has an associated memory 215a (e.g., flash memory) including stored code 215*b* that implements a disclosed steam physical parameter determination algorithm and a level finding algorithm. The processor 215 also has associated digital logic 215*c* that comprises logic gates (e.g., a FPGA) that can be configured to implement a disclosed steam physical parameter determination algorithm and a level finding algorithm. Only one of the code 215*b* and the digital logic 215*c* is needed to implement a disclosed steam physical parameter determination algorithm and a level finding algorithm. The processor 215 can comprise a digital signal processor (DSP), a microcontroller, an application specific integrated circuit (ASIC), a general processor, or any other combination of one or more integrated processing devices.

The PRG 250 is also shown including a transceiver 220 providing a transmitter and a receiver that by the coaxial connector 223 shown couples to the top of the tank 205. The transmitter and the receiver provided by transceiver 220 may be implemented as separate blocks. Accordingly, a "transceiver" as used herein includes both of these arrangements. A flange (not shown in FIG. 2) may also be present at the top of the steam boiler tank 205. The steam boiler tank 205 may also include a nozzle. The probe is shown as 244 that includes a RR 224 between a lower narrower portion 244*a* and an upper wider portion 244*b*, where the RR 224 is above the level of the water 208 in the steam boiler tank 205. The RR 224 should generally always be sufficiently above the surface of the water 208 so that it is always above the water level so that an accurate measurement of its apparent position can be made.

Although not shown in FIG. 2, there is also a heater associated with the steam boiler. The steam boiler tank 205 is generally a reservoir for saturated steam and saturated water. Steam is drawn off the steam boiler tank 205 at the top and water and steam are supplied to the tank from the bottom. The heating usually occurs in risers which pass through a firebox for a water tube boiler. It may also be possible that heating occurs inside the tank with fire tube boilers. One function of the steam boiler tank 205 would be to prevent liquid water from getting into the superheater section.

Disclosed embodiments can be applied to generally any type of steam boiler. For example, to boiler drums, high pressure feedwater heaters, steam separators, and hydrogen reformers, and generally also boilers used for power generation.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. For example, although this Disclosure is described for determining at least one steam physical property in steam boiler tanks, in principle any liquid in a tank having a GWR sensor installed can benefit from this Disclosure, because liquids with a significant vapor pressure have a fixed relationship between refractive index and pressure in general have what is needed for a disclosed physical property determination using GWR. In addition, while a particular feature may have been disclosed with respect to only one of several implementations, such feature may be combined with one or more other features of the other implementations as may be desired and advantageous for any given or particular application.

The invention claimed is:

1. A guided wave radar (GWR)-based method of measuring a steam physical property, comprising:

transmitting at least a first microwave pulse signal from a GWR sensor system comprising a pulsed radar gauge (PRG) including a processor implementing a steam measurement algorithm coupled to a transceiver that is coupled to a GWR probe in a steam boiler tank having a reference reflector (RR) along its length providing an impedance discontinuity with water and steam in said steam boiler tank;

receiving an echo emanating from said RR responsive to said first microwave pulse signal to generate respective time of flight (TOF) measurement data;

determining at least one said steam physical property including a refractive index value of said steam from said TOF measurement data, and a pressure and a temperature of said steam calculated from said refractive index value.

2. The method of claim 1, wherein said determining further comprises utilizing said TOF measurement data together with a reference TOF value representing a TOF measurement without said steam in said steam boiler tank.

3. The method of claim 2, wherein said reference TOF value is obtained by transmitting a second microwave pulse signal without said steam into said steam boiler tank, and receiving an echo emanating from said RR responsive to said second microwave pulse signal.

4. The method of claim 1, wherein said steam physical property comprises a pressure of said steam.

5. The method of claim 1, wherein said determining said refractive index value comprises determining an apparent change in a distance from a top reference level to said RR.

6. The method of claim 1, further comprising determining a temperature of said steam from said steam physical property.

7. The method of claim 1, wherein said first microwave pulse signal is also used for determining a level of said water in said steam boiler tank.

8. The method of claim 1, wherein said steam measurement algorithm is implemented by code stored in a memory associated with said processor.

9. The method of claim 1, further comprising comparing said steam physical property comprising at least one of pressure and a temperature of said steam to a predetermined level, and automatically initiating at least one corrective action in an event of an over pressure or over temperature condition, or for control using a set point and adjusting at least one of heating and flow rates to keep at least one of said temperature and said pressure at said set point.

10. The method of claim 9, wherein said corrective action comprises issuing an alarm, opening of a pressure relief valve, reducing a fuel flow rate, or adding cooling water.

11. A guided wave radar (GWR) sensor system, comprising:

a GWR sensor system comprising a pulsed radar gauge (PRG) including a processor implementing a steam measurement algorithm coupled to a transceiver that is coupled to a GWR probe having a reference reflector (RR) along its length providing an impedance discontinuity adapted to be inserted into a steam boiler tank, said steam measurement algorithm determining at least one steam physical property including a refractive index value of steam from time of flight (TOF) measurement data, and a pressure and a temperature of said steam calculated from said refractive index value obtained from an echo emanating from said RR responsive to transmitting at least a first microwave pulse signal into said steam boiler tank to generate said TOF measurement data.

12. The system of claim 11, wherein said determining further comprises utilizing said TOF measurement data together with a reference TOF value representing a TOF measurement without said steam in said steam boiler tank.

13. The system of claim 12, wherein said reference TOF value is obtained by transmitting a second microwave pulse signal without said steam into said steam boiler tank, and receiving an echo emanating from said RR responsive to said second microwave pulse signal.

14. The system of claim 11, wherein said steam physical property comprises a pressure of said steam.

15. The system of claim 14, wherein said first microwave pulse signal is also used by a level finding algorithm for determining a level of water in said steam boiler tank.

16. The system of claim 11, wherein said determining said refractive index value comprises determining an apparent change in a distance from a top reference level to said RR.

17. The system of claim 11, wherein said steam measurement algorithm further comprises determining a temperature of said steam from said steam physical property.

18. The system of claim 11, wherein said steam measurement algorithm is implemented by code stored in a memory associated with said processor.

19. The system of claim 11, wherein said steam measurement algorithm is implemented by digital logic.

* * * * *